Jan. 1, 1952     O. H. BANKER     2,580,381
DRIVING AND STEERING MECHANISM Filed Oct. 7, 1947     2 SHEETS—SHEET 1

INVENTOR.
Oscar H. Banker,
BY
Cromwell, Greist & Warden
Attys.

Jan. 1, 1952            O. H. BANKER            2,580,381

DRIVING AND STEERING MECHANISM

Filed Oct. 7, 1947                              2 SHEETS—SHEET 2

INVENTOR.
Oscar H. Banker,
BY
Cromwell, Greist & Warden

Patented Jan. 1, 1952

2,580,381

UNITED STATES PATENT OFFICE 2,580,381

DRIVING AND STEERING MECHANISM

Oscar H. Banker, Evanston, Ill., assignor to New Products Corporation, Chicago, Ill., a corporation of Delaware Application October 7, 1947, Serial No. 778,382

34 Claims. (Cl. 74—720.5)

The present invention relates to an improved mechanism for driving and steering well known types of tractor or crawler type vehicles by control of the speed of independently driven endless tracks on opposite sides of the vehicle.

It is an object of the invention to provide an improved driving and steering mechanism of the above type which is of outstanding simplicity in its structural details and in which an improved control is afforded to turn the vehicle in widely varying arcs or to regulate its power and speed by means of combined hydraulic and mechanical instrumentalities coordinated and actuated from a single control device in a novel and improved manner.

More specifically, it is an object of the invention to provide such a mechanism including a planetary gear train wherein the speed of rotation of a reaction member of said train is controlled by a combined hydraulic-mechanical means, thereby to regulate the speed and power output of a shaft or member driven by said train.

Generally, it is an object to provide a driving and steering mechanism, and in particular a planetary type mechanism, wherein a wide range of speed and power ratios of a driven member relative to a driving member may be obtained, thereby enabling a vehicle powered through and controlled by the mechanism to perform a large variety of turns, i. e., from a zero degree or spot turn to a very gradual turn in an arc of long radius.

Yet another object is to provide a mechanism of the foregoing type including a hydraulically controlled clutch normally operative to lock two parts of the mechanism for rotation as a unit, together with further means actuable concurrently with the release of the clutch to variably control the rate of relative rotation of said parts.

It is also an object to provide a mechanism of the sort described in the preceding paragraph, in which the variation of rate of rotation of the parts involved is preceded by a coordinated disengagement of the clutch, thereby freeing said parts from their driving interconnection.

It is a still further object to provide a driving and steering mechanism characterized by a pair of like, mutually independent, planetary operating units driven from a common drive to control a pair of output shafts, said operating units being controlled by hydraulic pressure, in which hydraulic pressure is led to said units from a common pressure source through a pair of independently operated control valves, one for each unit.

Another object is to provide a dual mechanism of the foregoing type in which each of said control valves is provided with a pressure checking element to maintain pressure in the associated operating unit in the event of a pressure drop in the other operating unit of the mechanism.

In another aspect, it is an object of the invention to provide a combined hydraulic-mechanical control for a driving and steering mechanism characterized by novel provisions for removing certain sub-assemblies of the mechanism for repair and replacement of parts with a minimum of delay and inconvenience and without disturbing the operative relation of said sub-assemblies to one another.

More specifically, it is an object to provide a mechanism of the above described type including a hydraulically controlled clutch and further provisions for supplying hydraulic operating medium thereto, wherein said clutch and further provisions may be readily and quickly removed as a unit from the remainder of the mechanism for servicing or replacement.

Yet another object is to provide a mechanism of the foregoing type including provisions whereby the rotative power transmitting parts thereof are supported for rotation in a novel manner to most effectively sustain the operating load.

The foregoing statements are indicative in a general way of the nature of the invention, but other and more specific objects will be apparent to those skilled in the art upon a full understanding of the construction and operation of the device.

A single embodiment of the invention is presented herein for purpose of exemplification, but it will be appreciated that the invention is susceptible of incorporation in other modified forms coming equally within the scope of the appended claims.

Presently known mechanisms for controlling the driving and steering of so-called tractor, track laying or crawler types of vehicles are generally characterized by the multiplicity and complexity of the parts thereof, and by the attendant difficulties of initial assembly and subsequent dismantling for repair, replacement of parts or otherwise. Likewise, an inherent inflexibility or lack of adequate range in affording different speed and power ratios of the opposed endless tracks of the powered vehicle is characteristic of conventional mechanisms, which is particularly objectionable in that it has prevented the accomplishment of a desired shortness and abruptness of turning angle in the operation of the vehicle. Furthermore, the referred to complexity of construction has usually been accompanied by undesirable complexity in the manipulation of the controls of the vehicle, primarily accounted for by the duplication of operation control levers and other instrumentalities.

The present invention eliminates the above objectionable features, affording a tractor driving and steering mechanism capable of accomplishing a zero degree or spot turn on a dead track, as well as turns in a wide range of more gradual arcs. Although the mechanism in the illustrated embodiment is shown in combination with planetary gearing, which is a desirable arrangement in that it contributes substantially to the obtaining of the above mentioned wide versatility in operation, it is to be understood that certain of the features of the invention are not necessarily limited in this respect. Generally speaking, the invention is characterized by clutch connected and brake controlled parts in association with a novel hydraulic control for the clutch assembly, and means for effecting simultaneous manipulation of the brake and hydraulic clutch control elements to afford an increased power ratio and decreased speed of the track or tracks powered by the assembly.

A further feature of the invention deals with provisions whereby the clutch assembly and certain elements of the hydraulic fluid supply members associated therewith are adapted for bodily removal as a unit for servicing, repair or replacement of parts, by a few simple and quickly performed operations.

Referring to the drawings, the driving and steering mechanism of the present invention is generally designated by the reference numeral 10, said mechanism including a housing 11 in and by which the parts to be described are supported and journaled for rotation. Power for driving the rotative parts of the mechanism is derived from a central beveled ring gear 12, which is in turn driven in well known fashion from a shaft (not shown) extending longitudinally and centrally of the vehicle. Ring gear 12 is bolted or otherwise secured to a driving hub 13 keyed or splined on a tubular central drive shaft 14 extending transversely of the vehicle.

Said shaft 14 constitutes a common source of power for the clutch and brake controlled planetary assembly 15 to one side thereof and also for a similar assembly to the opposite side thereof, the details of which are identical. Hence, the second assembly is not illustrated and described in detail, but in so far as parts thereof are shown, they are merely designated by the same reference numerals, primed, as are employed in connection with the other assembly.

Shaft 14, on one side of hub 13, has a driving flange or spider 16 keyed thereto, which member is suitably journaled for rotation in the housing 11 by means of an anti-friction roller bearing 17. Immediately adjacent the bearing 17 shaft 14 is axially counterbored at 18 and provided with an internal sleeve-type pilot bearing 19 in which one end of a power take-off shaft 20, coaxial with shaft 14, is rotatably supported. This bearing serves as one of the main supports of the planetary assembly to be described.

The hub 21 of a planetary gear carrier 22 is splined or keyed at 23 on shaft 20, adjacent its pilot end. Said carrier is provided with the radially extending flange 24 for the support of certain elements of the planetary gearing to be described. Externally thereof, the elongated gear carrier hub 21 rotatably carries an elongated, sleeve-like reaction member 25 provided with reaction gear teeth 26 at one end thereof. Sleeve bearings 27 provide a frictionless journal for the reaction member on the carrier hub.

The reaction gear teeth 26 mesh with a set of planetary gears 28 disposed in spaced circumferential arrangement in the carrier 22, of which only one gear is shown, however. These gears are each mounted by a roller-type bearing 29 on a stub shaft 30 which is pinned at 31 to the flange 24 of the planetary carrier 22. The planetary gears mesh radially outwardly with an axially extending ring gear 32 which is secured by bolts 33 to the driving flange 16, it being noted that said ring gear is recessed or rabbeted on an inner peripheral edge to engage on a shoulder 34 formed on the flange 16.

A special brake drum 36 coaxial with gear carrier 22 serves to receive and support the end of the respective planetary gear stub shafts 30 opposite the pinned end thereof. Hence, said drum is positively coupled by said shafts, as well as by bolts between planet gears, to the planetary carrier to rotate therewith as a single unit. The speed of rotation of drum 36 is controlled by a brake band 37 of conventional type, which is engageable with the external drum periphery. A linkage for actuating this band will be hereinafter described in detail.

The drum 36 has novel provisions for receiving ring gear 32 to permit nested or telescoped disposition of said ring gear in said recess, enabling its removal with the differential assembly for servicing of the latter when such is desired, as contemplated by the invention. To this end, the drum is provided with an annular, internal recess 38 of depth corresponding approximately to the axial dimension of ring gear 32, into which recess the planetary gears 28 project radially for meshing engagement with the ring gear. This recess is adapted to receive said ring gear when the latter is freed from the flange 16 by loosening and backing off bolts 33 from the solid line to the dotted line position shown in Fig. 1. The ring gear may then be shifted axially off the above mentioned flange shoulder and into recess 38, to the position illustrated in dotted lines in Fig. 1, enabling the drum, the carrier 22 and other associated parts to be described to be lifted out of housing 11 without interference with the permanently installed driving flange. The drum 36 carries an axially extending hub 39, the hub being provided with radially outwardly projecting teeth or splines 40, for a purpose to be described.

The hub 21 of planetary carrier 22 is rotatively supported at its outer end by means of a ball bearing 41 in an annular hydraulic fitting 42 which is secured to a boss or bosses 43 on a side wall of housing 11 by a plurality of bolts 44. Said fitting 42 is provided with an internal passage 42' which is supplied with a hydraulic operating medium, such as a suitable grade of natural or synthetic lubricating oil, through a supply line 45 tapped into the fitting. Said liquid is supplied under adequate pressure to effect the control operations contemplated and hereinafter described in detail. The passage 42' discharges radially outwardly of the fitting 42, between a pair of annular sealing rings 46 disposed in recesses in said fitting, to and through a plurality of radial passages 47 in a rotatable clutch control and brake drum 48. Drum 48 has a bearing on the fitting 42 and is keyed to the reaction member 25 for rotation therewith as a unit.

Figure 1:
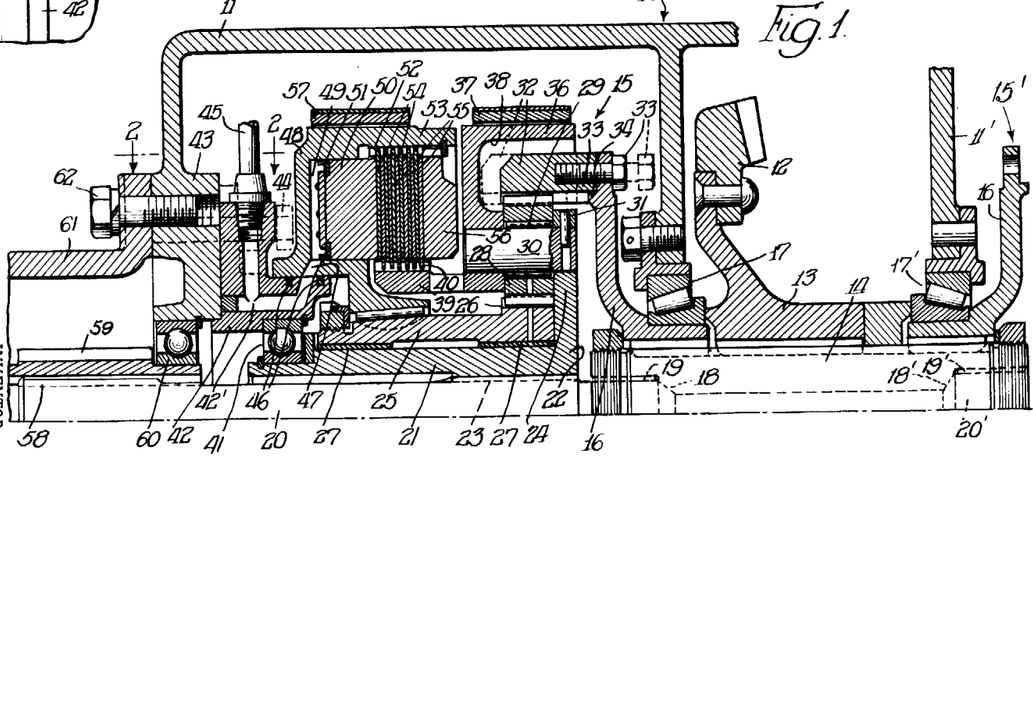
Fig. 1 is a fragmentary view in longitudinal, axial or central section through a driving and steering mechanism in accordance with the invention, it being understood that only a portion of the complete mechanism is illustrated for simplicity's sake, and that the various instrumentalities to be hereinafter described are duplicated on both sides of a central driving member of the assembly.
Figure 2:
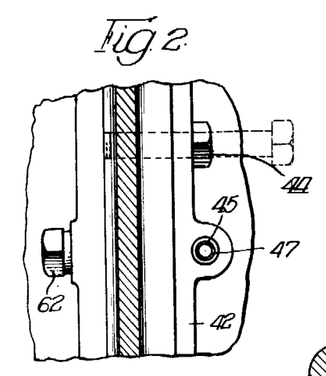
Fig. 2 is a fragmentary view, taken approximately on line 2—2 of Fig. 1, illustrating a detail of construction.

The passages 47 communicate radially with an annular control cylinder 49 formed in drum 48, in which an annular plunger 50 is mounted for axial sliding movement, said plunger being sealed by flanged washer-type sealing members 51 at the inner and outer peripheries thereof; and hydraulic pressure normally existing in cylinder 49 serves to urge plunger 50 to the right in Fig. 1. Radially projecting and axially extending teeth or splines 52 are formed in the inner surface of the outer flange 53 of drum 48, with which the series of annular friction disks 54 are engaged. Accordingly, said disks are rotatable with the drum while being shiftable axially relative thereto. Similar friction disks 55 alternate with disks 54 and are similarly engaged with the teeth or splines 40 on the hub 39 of brake drum 36. Said disks are axially sustained by an annular backing ring 56 which, like the disks 54, is splined to drum flange 53. Hence it is apparent that the pressure actuated plunger 50 acts to engage the clutch disks in the manner of a clutch pressure plate.

A brake band 57 of well known type, actuating provisions for which are hereinafter described, is associated with the drum flange 53 to control the speed of rotation thereof. At its outer extremity the power output shaft 20 is keyed at 58 to a track driving pinion 59 and, with said pinion is rotatably supported by housing 11 by means of a ball bearing 60. A casing 61 for the track drive gearing is secured to housing 11 by bolts 62.

Figure 3:
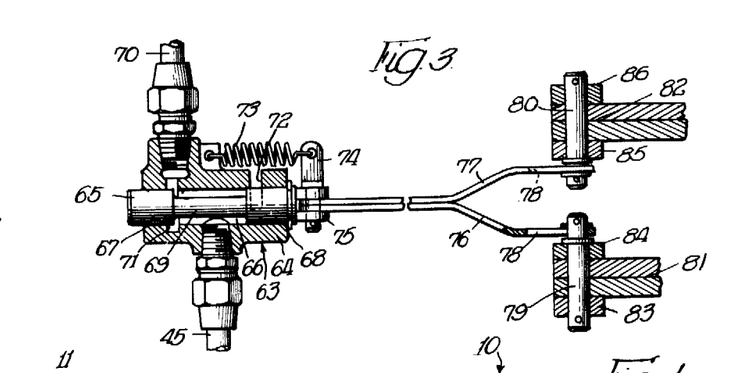
Fig. 3 is a somewhat enlarged fragmentary view, partially broken away, taken in section corresponding approximately to line 3—3 of Fig. 5, illustrating details of construction of a hydraulic control which is operatively coupled with certain mechanical braking devices of the mechanism, and fluid connections to said control and between the latter and the parts illustrated in Figs. 1 and 2.
Figures 4, 5:
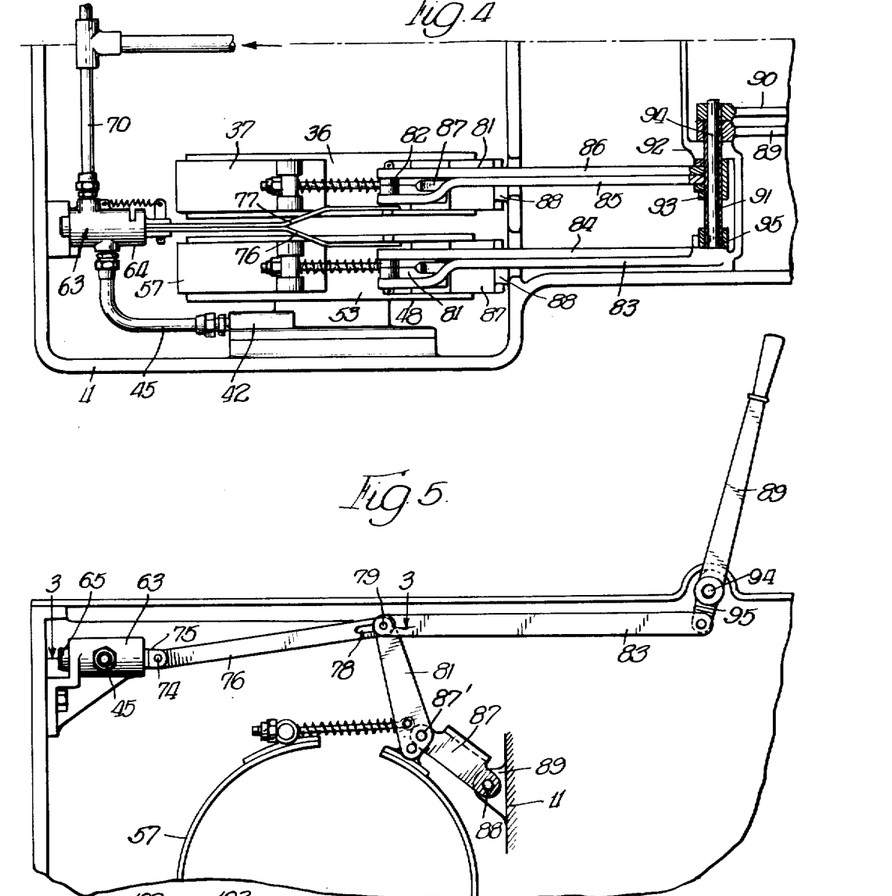
Fig. 4 is a fragmentary view which further illustrates somewhat diagrammatically the combined and simultaneously operative control for the hydraulically and mechanically actuated instrumentalities of the present mechanism.
Fig. 5 is a fragmentary view in side elevation of the parts appearing in Fig. 4.

Manually operated control instrumentalities for the simultaneous control of either the brake band 37 and hydraulically operated clutch parts, or the brake band 57 and the same parts, or for the control of both combinations, are illustrated in Figs. 3, 4 and 5, to which attention is now directed. The showing is more or less diagrammatic for the sake of simplicity; however, sufficient details of the parts and their operative relationship are illustrated to enable clear understanding thereof.

The supply of hydraulic operating liquid to the pressure cylinder 49 through pipe 45 is controlled by a plunger-type valve 63 appropriately secured on the housing 11 or other support. Pipe 45 communicates with one side of the axially bored cylinder 64 of said valve and a control plunger 65 is reciprocable in the bore 66 of said cylinder. Said plunger has axially spaced end portions 67, 68 of diameter corresponding to that of the cylinder bore and an intermediate portion 69 of substantially less diameter. The valve plunger portion 67 is adapted to control the flow of pressure liquid from a hydraulic supply line 70 through an annular internal recess 71 in the cylinder bore adjacent said plunger portion, and thence through the annular space surrounding the reduced-diameter intermediate portion 69 to the pressure pipe 45. Line 70 is appropriately connected to a pump for forwarding the control liquid under a pressure of say 75 pounds per square inch. The other plunger end portion 68 is adapted to control voiding of liquid from the bore of cylinder 64 to the exterior of the latter or to a sump through an outwardly opening radial slot 72 communicating with said bore adjacent said portion 68.

As illustrated in Fig. 3, full hydraulic pressure is normally maintained through lines 70 and 45, thence through passage 42' to the pressure chamber 49, whereby the clutch plates 54, 55 are frictionally engaged to lock drum 48 and reaction member 25 for rotation as a unit. However, when the plunger 65 is shifted axially to seal off annular recess 71 and expose slot 72, the pressure liquid in chamber 49 is voided through said slot, the clutch engaging pressure terminating. Relative rotation of the reaction member 53 and planetary carrier 24, to which it was previously rigidly connected by the clutch engagement of drum 48 with the reaction member 25, as well as by the locked planetary gearing 28, reaction teeth 26 and driving ring 32, is now permitted.

The hydraulic control plunger 65 is normally urged to position to maintain clutch plate pressure by a coil spring 73 connected at one end to the control cylinder 64 and at its opposite end to a pin 74 extending through spaced eyes 75 carried by said plunger. This pin also serves to couple to the plunger a pair of like tension links 76, 77 whereby the plunger is shifted to pressure cut-off position; and the means whereby said links are coupled to the brake bands 37, 57 so as to afford simultaneous, coordinated operation of the clutch and either or both of the respective brake drums 36, 48 is of primary importance in the present invention.

Each of the links 76, 77, at its end opposite plunger 65, is provided with an elongated slot 78 which internally receives one of the respective pins 79, 80 which pivotally connect the respective brake operating toggle arms 81, 82 with the respective sets of draw rods 83, 84 and 85, 86. Arms 81 are each of two-piece or forked construction, straddling the adjacent tongue of the toggle fulcrum member 87 adjacent their lower end. They are pivoted at 87' to this projecting tongue at a point closely adjacent their point of pivotal connection to the brake bands 57 and 37. The member 87 is provided with spaced pivot ears 88 at its opposite end pivoted on a bracket 89, on housing 11, and the parts described are operative to apply toggle action to tighten the bands 57 or 37 when arms 81, 82 are actuated clockwise, as viewed in Fig. 5. The respective pins 79, 80 are carried at their ends by the respective sets of draw rods 83, 84 and 85, 86 located on opposite sides of the respective arms 81, 82, in the fashion illustrated in Fig. 4, the pin carrying ends of said bars being spread from one another for this purpose. It will be understood that each set of rods acts as a unit.

Accordingly, if either the draw rods 83, 84 or 85, 86 are tensioned to apply the respective brake bands 57, 37, the corresponding link 76 or 77 is also drawn to the right to shift its control plunger 65 and release the clutch connection between the reaction member 25 and the drum planetary carrier 22. If draw rods 83, 84 are actuated, the declutching is accompanied by retardation or stopping of the reaction member and variable planetary action to variably decrease the speed and increase the power output, depending on the degree of braking force applied. If rods 85, 86 are actuated, the declutching is accompanied by positive braking of output shaft 20. The arrangement is such that initial movement of the aforesaid rods, in which the clearance between the bands 37 and/or 57 and the drums is taken up, is sufficient to bring the valve to full clutch release position, prior to applying pressure on the bands.

In order to shift the aforesaid draw rods, I employ the two control levers 89, 90 shown in Figs. 4 and 5. The former is keyed or otherwise fixedly secured on an elongated rocker sleeve 81 which is rotatably mounted in a fixed support 92. Said sleeve is in turn fixedly connected to a rocker arm 93 on which the adjacent end of the set of draw rods 85, 86 is pivoted. Sleeve 91 internally receives the elongated rock shaft 94 for free rotation therein, which rock shaft is key connected at opposite ends to the downwardly extending rocker arm 95 and to the control lever 90. Rocker arm 95 is in turn pivoted to the adjacent end of the set of draw rods 83, 84.

Brake band 37 may also be advantageously controlled by foot, substituting a pedal for the lever 89, thereby reducing the number of manual controls.

In the operation to constrict the brake band 57 or 37 about the respective drums 48, 36, the arms 81 or 82 are rocked clockwise about their pivot to the fulcrum member 87 and one of the tension links 76 or 77 (or both in the event both arms are actuated) simultaneously actuated to void the pressure in the clutch pressure cylinder 49. Regardless of which control lever 89 or 90 is manipulated for the above purposes, and the attendant outward travel of the associated tension link, the tension link corresponding to the other control lever therefor is ineffective to disturb the toggle operating arm 81 or 82 associated therewith, since the elongated slot 78 merely causes said link to shift longitudinally relative to the pivot pin 79 or 80 received therein.

In operation, assuming that the tractor is being operated at full speed for any conventional transmission gear associated therewith, full hydraulic line pressure is transmitted through control valve 63 to the annular clutch pressure cylinder 49 to maintain the clutch locked connection of drums 48, 36 and consequent locked relation of reaction member 25 to the planetary carrier 22. A direct drive through the mechanism results. Should it be desired to slow either or both sides of the mechanism, this can be done by operation of lever 89 and application of brake band 37 with variable braking force, whereupon the hydraulic pressure is voided, the clutch disengaged and a simple mechanical braking action is applied through drum 36 on the planetary carrier 22 and output shaft 20 keyed thereto. By manipulating the other control lever 90 on either side to apply a variable degree of braking action on the flange 53 of drum 48, the clutch connection is also interrupted and the rotation of said drum is diminished to whatever degree is desired, either by permitting a variable slip of the drum flange beneath band 57 or bringing the drum to a full halt. Reaction member 25 and planetary carrier 22 then rotate relative to one another, with attendant reduced speed and increased power of drive of the corresponding driven shaft 20 due to the planetary action of the gear train.

It is possible to proceed forward at slower speed and in a higher power ratio if both bands 57 are applied correspondingly by manipulation of both levers 90; or, by varying the ratio of braking forces thereon, to make turns of widely variable arc at increased power through the planetary train. Attention is also directed to the fact that, in the use of the present mechanism with a conventional variable speed transmission, for example, a four-speed transmission, the increased power ratio available by simultaneous manipulation of both brake bands 57 actually doubles the number of speeds available through said transmission.

Furthermore, on the assumption that the mechanism is embodied in combination with a variable speed transmission, as mentioned above, the vehicle may be fully halted in any operative gear ratio of such transmission, without disengaging the drive shaft from the engine. This affords a neutral or idler condition which is available without manipulating the gear shift of the transmission.

The mechanism provides a direct forward, clutch connected drive in which less clutching area is required, by reason of the planetary lock-up feature, than in a conventional clutch capable of locking the power input and output sides with corresponding rigidity.

Figure 6:
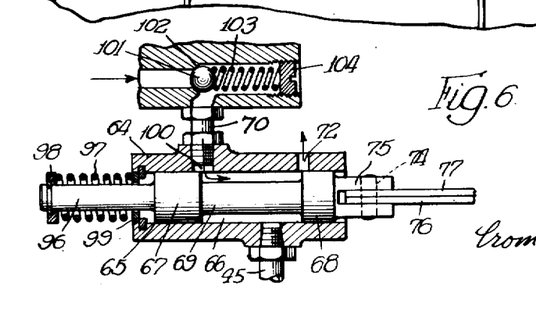
Fig. 6 is a fragmentary view in longitudinal section through a slightly modified form of control valve arrangement, which may be used in substitution for the control provisions illustrated in Fig. 3 to afford a still greater range of control of the mechanism by variation of the clutch engaging force of the latter.

The operational range of the mechanism may be still further increased by incorporating therein the variable pressure, hydraulic control valve arrangement illustrated in Fig. 6, in substitution for the valve details described above and illustrated particularly in Fig. 3. Since many of the details of this arrangement are similar to the structure shown in Fig. 3, they are indicated by like reference numerals.

The control plunger 65 is provided with an extension 96 at the end thereof opposite the tension links 76, 77, said extension being surrounded by the coil compression spring 97. Spring 97 bears at its opposite ends against abutment washers 98, 99 adjacent and in fixed relation to the outer end of the plunger extension, and to the valve housing 64, respectively. Spring 97 normally urges the plunger 65 to the left. Said plunger 65 is so designed and positioned in the bore 66 of the housing as to enable the exhaust passage or slot 72 to the sump to be variably exposed, while the inlet port 100 is open. However, it will be understood that the passage 72 is normally closed by the right-hand enlarged portion 68 of plunger 65.

By the above provision, the hydraulic force on annular plunger 50 in the pressure cylinder or chamber 49 may be varied by simply shifting the valve member 65 in a manner to expose the passage 72 to a lesser or greater degree. This enables slipping of the clutch disks 54, 55 to a corresponding extent, accompanied by variable movement of reaction member 25 relative to gear carrier 22, and by variable planetary action between the gears 28 and reaction teeth 26, in a readily understood manner.

In accomplishing the above variable clutch release of the assembly 15, it is of course necessary to avoid reducing or voiding of the full line pressure effective on the planetary clutch assembly 15' at the opposite side of the mechanism. Accordingly, I introduce a ball check 101 in the pressure supply line 70 which is urged against a seat 102 by a coil spring 103. This ball check is in addition to the normal pump relief valve (not shown) and may be adjusted, as to the force it exerts on the ball check 101, by manipulation of the threaded plug 104. Assuming that the usual pump relief valve will control the pump delivery output at, say, not more than 100 pounds per square inch, the ball check 101 will be adjusted to engage seat 102 when the pressure falls below 80 pounds per square inch. Since the clutches of the mechanism are intended to operate at about 75 pounds per square inch, the pressure in the clutch assembly 15' which is not being manipulated will never fall below its operating value. The clutch assembly 15 is therefore variable to introduce a desired slip and thereby further increase the range of turning arcs made possible by the mechanism, without danger of release and slippage of the other clutch. It will be seen that this introduces some precautionary effect in the hydraulic line as is attained in a mechanical manner by the provision of the elongated slots 76, 77 in the tension links 76, 77.

The pressure checking assembly in each of the regulator valves which control the planetary units at either side of the driving and steering mechanism or steering clutch is of substantial importance, in an installation wherein the hydraulic pressure is derived from a common source. Each ball check 101 serves as a pressure control and regulator for the pressure line to the unit other than that with which said ball check and its coacting valve assembly are associated. The present dual planetary steering mechanism, characterized by twin hydraulically controlled clutch-brake units, acting independently of one another and independently controlled even though actuated from a common mechanical driving element, and a common source of hydraulic pressure which is distributed through a pair of individual, independent regulating valves, one associated with each of said units, said valves having the aforesaid improved, inter-regulatory pressure checking action, is, so far as I am aware, an entirely novel arrangement in the class of mechanisms here involved.

I have referred to the fact that the clutch and hydraulic pressure sub-assemblies of the present mechanism are readily removable as a unit for repair or servicing. In accomplishing this, the output shaft 20 is first withdrawn by simply sliding the same endwise and outwardly from its pilot bearing 19. The bolts 33 are then backed off and withdrawn to the dotted line position of Fig. 1 and the bolts 44 adjacent the other side of housing 11 are similarly loosened and withdrawn to dotted line position, also shown in Fig. 1. Ring gear 32, being freed from flange 16 by removal of bolts 33, may then be shifted to its left-hand dotted line position in the annular recess 38 of drum 36. Upon shifting of the hydraulic pressure fitting 42 to the right to clear the same of the boss 43 of the housing, the entire unit including planetary carrier, reaction member 25, drums 48, 36, bands 57, 37 and hydraulic fitting 42 may be lifted bodily as a unit from the housing. The assembly may be replaced as a unit with similar ease. Notwithstanding this advantageous feature, the parts are well and solidly journaled and piloted adjacent the housing side walls so that there is no distortion or misalignment possible in the operation of the mechanism. The structure is also notable for its compactness, due to the extensive telescoping or axial nesting of the parts.

Those skilled in the art will of course appreciate the possibility of making various alterations and modifications in the above described mechanism, without departing from the principles of the invention. For example, it is evident that the clutch might well be disengaged by hydraulic force, rather than using this force to engage the clutch. In such event, a suitable spring means might be employed to apply the clutch. Alternatively, the clutch pressure member 50 might be shifted in both axial directions by a hydraulic control including proper supply lines and reversing valve. I therefore contemplate that the recital of clutch control means is the claims be construed sufficiently broadly to cover these alternatives. Other obvious modifications in the mechanism suggest themselves equally readily and are likewise regarded as being within the scope of the invention.

I claim:

1. A mechanism of the type described, comprising a rotatable driving member, a rotatable driven member, a normally engaged, fluid pressure operated clutch including coacting elements drivingly connected to said respective members and operative to normally connect said members for rotation together, fluid pressure control means including a fluid pressure source connected to the clutch and a control valve normally maintaining clutch engaging pressure from said source on said clutch, said valve being actuable to relieve said pressure and thereby release said clutch, means to retard one of said members relative to the other, means to actuate said retarding means, and means distinct from but operatively connected to said last named actuating means and operative to actuate said control valve, whereby to release said clutch coordinately with actuation of said retarding means.

2. A mechanism of the type described, comprising a rotatable driving member, a rotatable driven member, a normally engaged, fluid pressure operated clutch including coacting elements drivingly connected to said respective members and operative to normally connect said members for rotation together, fluid pressure control means including a fluid pressure source connected to the clutch and a control valve normally maintaining clutch engaging pressure from said source on said clutch, said valve being actuable to relieve said pressure and thereby release said clutch, means to retard one of said members relative to the other, means to actuate said retarding means, and means distinct from but operatively connected to said last named actuating means and operative to actuate said control valve, whereby to release said clutch coordinately with actuation of said retarding means, said retarding means comprising a brake drum adapted for driving connection with the retarded member, said control means further including a pressure member normally subject to pressure from said source and slidable axially in said drum, said pressure member normally maintaining engagement of said clutch elements with one another.

3. A mechanism of the type described, comprising a rotatable driving member, a normally engaged, fluid pressure controlled clutch including clutch elements operatively connected to said respective members and normally coupling said members for rotation together, fluid pressure control means to control the clutch including a fluid pressure source connected to the clutch and a control valve to regulate pressure between said source and said clutch, means to retard one of said members relative to the other, means to actuate said retarding means, and means distinct from but operatively connected to said last named actuating means and to said control valve to operate the latter coordinately with actuation of said retarding means.

4. A mechanism of the type described, comprising a driving member, a driven member, a normally engaged, fluid pressure controlled clutch including clutch elements operatively connected to said respective members and normally coupling said members for rotation together, fluid pressure control means to control the clutch including a fluid pressure source connected to the clutch and a control valve to regulate pressure between said source and said clutch, means to retard one of said members relative to the other, means to actuate said retarding means, and means distinct from but operatively connected to said last named actuating means and to said control valve to operate the latter coordinately with actuation of said retarding means, said retarding means comprising a brake drum adapted for driving connection with the retarded member, said control means further including means normally urging said coacting clutch elements in engagement with one another and operated under control of said valve.

5. In a mechanism of the type described, coaxial and rotatable driving and driven members, a planetary carrier rotatable with one of said members, planetary gearing rotatably mounted on said carrier, a gear in driving relation to the other of said members and meshing with said planetary gearing, a reaction member meshing with said planetary gearing, means including a normally engaged, fluid pressure controlled, releasable clutch device normally locking said reaction member for rotation with said planetary re-carrier, means operatively connected to said clutch device to control the same, including a fluid supply line and a valve therein, means operable when said clutch device is released to control the rate of relative rotation of said reaction member and carrier, means operable when said clutch device is released to control the rate of rotation of one of said first named members, and means to coordinately actuate said respective rate control means and said valve.

6. In a mechanism of the type described, coaxial and rotatable driving and driven members, a planetary carrier rotatable with one of said members, planetary gearing rotatably mounted on said carrier, a gear in driving relation to the other of said members and meshing with said planetary gearing, a reaction member meshing with said planetary gearing, means including a normally engaged, fluid pressure controlled, releasable clutch device normally locking said reaction member for rotation with said planetary carrier, means operatively connected to said clutch device to control the same, including a fluid supply line and a valve therein, selective separate means operable when said clutch device is released to control the rate of relative rotation of said reaction member and carrier or to retard one of said first named members, and means to coordinately actuate said respective separate means and said valve.

7. In a mechanism of the type described rotatable driving and driven members, a planetary carrier rotatable with one of said members, planetary gearing rotatably mounted on said carrier, means in driving relation to the other of said members and said planetary gearing, a reaction member in driving engagement with said planetary gearing, means including a normally engaged, fluid pressure controlled, releasable clutch device normally locking said reaction member for rotation with said planetary carrier, means operatively connected to said clutch device to control said device, including a fluid supply line and a valve therein, means to control the rate of relative rotation of said reaction member and carrier when said clutch device is released, means in said mechanism to govern the rate of rotation of one of said driving and driven members, and selective means to coordinately actuate said rate controlling means and said valve or said rate governing means and said valve, said last named means including a common control member and means connecting said retarding means and valve to said control member for simultaneous actuation thereby.

8. In a mechanism of the type described, coaxial and rotatable driving and driven members, a unitary combined brake element and planetary carrier rotatable with one of said members, planetary gearing rotatably mounted on said carrier, a gear in driving relation to the other of said members and meshing with said planetary gearing, a reaction member meshing with said planetary gearing, means including a normally engaged, fluid pressure controlled, releasable clutch device normally locking said reaction member for rotation with said planetary carrier, means operatively connected to said clutch device to control the same, including a fluid supply line and a valve therein, means engageable with said brake element to retard rotation of said carrier relative to said reaction member when said clutch device is released, means to retard rotation of said reaction member, and means to coordinately actuate said respective rotation retarding means and said valve.

9. In a mechanism of the type described, coaxial and rotatable driving and driven members, a unitary combined brake drum and planetary carrier rotatable with one of said members, planetary gearing rotatably mounted on said carrier, a gear in driving relation to the other of said members and meshing with said planetary gearing, a reaction member meshing with said planetary gearing, means including a normally engaged, fluid pressure controlled, releasable clutch device normally locking said reaction member for rotation with said planetary carrier, means operatively connected to said clutch device to control the same, including a fluid supply line and a valve therein, means engageable with said brake drum to control the rate of relative rotation of said reaction member and carrier when said clutch device is released, means to retard rotation of said driven member, and means to coordinately actuate said respective last named means and said valve, said drum having a lateral recess into which said planetary gearing radially projected and into which said gear telescopes axially for mesh with said gearing.

10. In a mechanism of the type described, coaxial driving and driven members, a combined brake element and planetary carrier rotatable with one of said members, planetary gearing rotatably mounted on said carrier, a gear in driving relation to the other of said members and meshing with said planetary gearing, a further control element, a reaction member rotatable with said control element and meshing with said planetary gearing, means including a normally engaged, fluid pressure controlled, releasable clutch device normally locking said reaction member for rotation with said planetary carrier, means operatively connected to said clutch device to control the same, including a fluid supply line and a valve therein, separate means engageable with said respective brake and control elements to selectively control rotation of said reaction member relative to said carrier when said clutch device is released, or to retard said carrier, and means to coordinately actuate said respective separate means and said valve.

11. In a mechanism of the type described, coaxial driving and driven members, a combined brake drum and planetary carrier rotatable with one of said members, planetary gearing rotatably mounted on said carrier, a gear in driving relation to the other of said members and meshing with said planetary gearing, a further control drum, a reaction member normally rotatable with said control drum and meshing with said planetary gearing, means including a normally engaged, fluid pressure controlled, releasable clutch device normally locking said reaction member for rotation with said planetary carrier, means operatively connected to said clutch device to control the same, including a fluid supply line and a valve therein, separate means engageable with said respective drums to selectively control rotation of said reaction member relative to said carrier when said clutch device is released, or to retard said carrier, and means to coordinately actuate said respective separate means and said valve, said first named drum having a lateral recess into which said planetary gearing radially projects and into which said gear telescopes axially for mesh with said gearing.

12. In a mechanism of the type described, coaxial driving and driven members, a combined brake drum and planetary carrier rotatable with one of said members, planetary gearing rotatably mounted on said carrier, a gear in driving relation to the other of said members and meshing with said planetary gearing, a further control drum, a reaction member normally rotatable with said control drum and meshing with said planetary gearing, means including a normally engaged, fluid pressure controlled, releasable clutch device normally locking said reaction member for rotation with said planetary carrier, means operatively connected to said clutch device to control the same, including a fluid supply line and a valve therein, separate means engageable with said respective drums to selectively control rotation of said reaction member relative to said carrier when said clutch device is released, or to retard said carrier, and means to coordinately actuate said respective separate means and said valve, said first named drum having a lateral recess into which said planetary gearing radially projects and into which said gear telescopes axially for mesh with said gearing, said control drum having said clutch device telescoped axially therein.

13. In a mechanism of the type described, a rotatable annular toothed power transmitting member, a gear carrier concentric with said member including a drum adjacent said member and in fixed, non-rotatable relation to said carrier, said drum being provided with an annular, axially extending recess opening to a side thereof which is of diameter generally corresponding to that of said member, said recess axially receiving said member within the drum, said gear carrier having an axially extending sleeve portion in fixed relation thereto, a gear journaled for rotation on said sleeve portion, and gears journaled on said carrier in meshing engagement with said member and last named gear.

14. A mechanism of the type described comprising a housing, a hydraulic clutch assembly in said housing including a rotary hydraulic clutch control device and a fitting to supply hydraulic control fluid to said device, means releasably securing said supply fitting to said housing adjacent an end of the assembly, a shaft extending axially through said assembly and having a pilot bearing supported by the housing adjacent the other end of the assembly, said shaft being withdrawable axially from said bearing and assembly to thereby enable removal of the latter from the housing in a direction transversely of the shaft axis upon release of said securing means.

15. A mechanism of the type described comprising a housing, a hydraulic clutch assembly in said housing including a rotary hydraulic clutch control device and a fitting to supply hydraulic control fluid to said device, said control member being mounted for rotation on said supply fitting, means releasably securing said supply fitting to said housing adjacent an end of the assembly, a shaft extending axially through said assembly and having a pilot bearing supported by the housing adjacent the other end of the assembly, said shaft being withdrawable axially from said bearing and assembly to thereby enable removal of the latter from the housing in a direction transversely of the shaft axis upon release of said securing means.

16. A mechanism of the type described comprising a housing, a hydraulic clutch assembly in said housing including a rotary hydraulic clutch control device and a fitting to supply hydraulic control fluid to said device, a drive member in coaxial driving relation to said assembly and rotatively journaled by said housing adjacent one end of the assembly, means releasably securing said supply fitting to said housing adjacent the other end of the assembly, a shaft extending axially through said assembly and having a pilot bearing supported by the housing adjacent first named end of the assembly, said shaft being withdrawable axially from said bearing and assembly to thereby enable removal of the latter from the housing in a direction transversely of the shaft axis upon release of said securing means.

17. A mechanism of the type described comprising a driven shaft, means to drive said shaft including a gear train, a clutch operatively connected to said gear train and shaft to drive the latter and means to engage and release said clutch, control means to vary the rate of rotation of said shaft, means to control said gear train to effect variable drive ratio therethrough upon operation of said clutch engaging and release means, and individual actuating means for said gear train control means and shaft control means, said respective actuating means being operatively connected to said clutch engaging and release means to operate the latter concurrently with actuation of either the gear train control means or the shaft control means.

18. A mechanism of the type described comprising a driven shaft, means to drive said shaft including a gear train, a clutch operatively connected to said gear train and shaft to drive the latter and means to engage and release said clutch, control means to vary the rate of rotation of said shaft, means to control said gear train to effect variable drive ratio therethrough upon operation of said clutch engaging and release means, and individual actuating means for said gear train control means and shaft control means, said respective actuating means being operatively connected to said clutch engaging and release means to at least partially release the latter prior to actuation of the respective gear train control means or shaft control means.

19. A mechanism of the type described comprising a driven shaft, means to drive said shaft including a gear train, a clutch operatively connected to said gear train and shaft to drive the latter and means to engage and release said clutch, control means to vary the rate of rotation of said shaft, means to control said gear train to effect variable drive ratio therethrough upon operation of said clutch engaging and release means, and individual actuating means for said gear train control means and shaft control means, said respective actuating means being operatively connected to said clutch engaging and release means to fully release the latter prior to actuation of the respective gear train control means or shaft control means.

20. In a mechanism of the type described, driving and driven members rotatable relative to one another, a planetary carrier drivingly connected to one of said members and having planetary gears thereon, a reaction member meshing with said gears, a normally engaged, fluid pressure-controlled clutch device causing said carrier to rotate with said first named members when said clutch device is engaged, said carrier being rotatable relative to one of said first named members when said device is released, separate rotation retarding means actuable upon release of said device, one of said means acting to retard rotation of said reaction member and another of said means acting to retard rotation of said carrier, fluid pressure controlled means operatively connected to said clutch device to engage and release said device, including a fluid supply line having a valve therein, and means connected to and coordinately actuating said respective rotation retarding means and said valve.

21. In a mechanism of the type described, driving and driven members rotatable relative to one another, a planetary carrier drivingly connected to one of said members and having planetary gears thereon, a reaction member meshing with said gears, a normally engaged, fluid pressure-controlled clutch device causing said carrier to rotate with said first named members when said clutch device is engaged, said carrier being rotatable relative to one of said first named members when said device is released, separate rotation retarding means actuable upon release of said device, one of said means acting to retard rotation of said reaction member and another of said means acting to retard rotation of said carrier, fluid pressure controlled means operatively connected to said clutch device to engage and release said device, including a fluid supply line having a valve therein normally operative to maintain clutch engaging force on said device, said valve being variably actuable to variably regulate said force, and means connected to and coordinately actuating said respective rotation retarding means and said valve.

22. A mechanism of the type described comprising a fixed mount, a fixed axial support releasably mounted for axial withdrawal from said mount, an axial operating assembly mounted for rotation on said support, said assembly including a driven element telescoped concentrically in said assembly and rotatively mounted on said support, and a gear in operative driving relation to said element, driving means for said assembly adapted to be disposed in driving engagement therewith, including a second gear meshing with said first gear and a member to which said second gear is releasably secured, and means releasably securing said axial support to said fixed mount and said second gear to said member, said assembly being shiftable bodily transversely of the axis of said support upon release of said respective securing means accompanied by axial withdrawal of said support from said mount.

23. A mechanism of the type described comprising a fixed mount, a fixed axial support releasably mounted for axial withdrawal from said mount, an axial planetary operating assembly mounted for rotation on said support, said assembly including an annular gear element telescoped concentrically in said assembly and rotatively mounted on said support, and a planetary gear in operative driving relation to said annular element, driving means for said assembly adapted to be disposed in driving engagement therewith, including a ring gear meshing with said planetary gear and a member to which said ring gear is releasably secured, and means securing said axial support to said fixed mount and said second gear to said member, said assembly being shiftable bodily transversely of the axis of said support upon release of said respective securing means accompanied by axial withdrawal of said support from said mount.

24. A mechanism of the type described comprising a fixed mount, a fixed axial support releasably mounted for axial withdrawal from said mount, an axial operating assembly mounted for rotation on said support, said assembly including a driven element telescoped concentrically in said assembly and rotatively mounted on said support, and a gear in operative driving relation to said element, driving means for said assembly adapted to be disposed in driving engagement therewith, including a second gear meshing with said first gear and a member to which said second gear is releasably secured, and means releasably securing said axial support to said fixed mount and said second gear to said member, said assembly including a recess internally receiving said second gear when released from said member, said assembly being shiftable bodily transversely of the axis of said support upon release of said securing means accompanied by axial withdrawal of said support from said mount.

25. A mechanism of the type described comprising a fixed mount, a fixed axial support releasably mounted for axial withdrawal from said mount, an axial operating assembly mounted for rotation on said support, said assembly including a driven element telescoped concentrically in said assembly and rotatively mounted on said support, and a gear in operative driving relation to said element, driving means for said assembly adapted to be disposed in driving engagement therein, including a second gear meshing with said first gear and a member to which said second gear is releasably secured, and means releasably securing said axial support to said fixed mount and said second gear to said member, said assembly including a recess internally receiving said second gear when released from said member, said assembly being shiftable bodily transversely of the axis of said support upon release of said securing means accompanied by axial withdrawal of said support from said mount, said recess housing said second gear for transverse shifting with the assembly.

26. A power transmission mechanism comprising a fixed support, an operating assembly normally carried by said support but removable endwise therefrom, a rotary support, an operating member removably mounted on said rotary support in operating engagement with said assembly, and a shaft telescoped in and drivingly connected to said assembly, said shaft being axially removable from said assembly, said assembly comprising a journal and a rotary power transmitting element concentric with said shaft and mounted for rotation on said journal, and means releasably securing said journal to said fixed support, said assembly being shiftable transversely of the axis of said shaft upon axial removal of said shaft, release of said journal from said fixed support and removal of said operating member from said rotary support.

27. A power transmission mechanism comprising a fixed support, an operating assembly normally carried by said support but removable endwise therefrom, and a shaft telescoped in and drivingly connected to said assembly, said shaft being axially removable from said assembly, said assembly comprising a journal and a rotary power transmitting element concentric with said shaft and mounted for rotation on said journal and means releasably securing said journal to said fixed support, a gear rotatively carried by said assembly and operatively connected in driving relation to said driven element, a further gear telescoped within said assembly and normally meshing with said first named gear, and an element on which said further gear is releasably mounted, said assembly and further gear being shiftable transversely of the axis of said shaft upon release of said journal from said fixed support and said further gear from said mounting element and upon axial withdrawal of said shaft relative to the assembly.

28. A driving and steering mechanism comprising a pair of fluid pressure controlled power transmission units, a common source of fluid operating pressure for said units, each of said units being normally subject to full operating pressure from said source, and a variable pressure control device for each of said units to connect the same to said source and operative to regulate the pressure acting on said units, each of said control devices being provided with a passage from said source to the unit, and with a spring urged check member acting to maintain a predetermined pressure in said passage when the pressure on one of said fluid operated units becomes lower than said full operating pressure.

29. A driving and steering mechanism comprising a pair of mutually independent, fluid pressure controlled, planetary type power transmission units, a common drive means therefor, a common source of fluid operating pressure for said units, each of said units being normally subject to full operating pressure from said source, and a variable pressure control device for each of said units to connect the same to said source, and operative to regulate the pressure acting on said units, each of said control devices being provided with a passage from said source to the unit, and with a spring urged check member acting to maintain a predetermined pressure in said passage when the pressure on one of said fluid operated units becomes lower than said full operating pressure.

30. A driving and steering mechanism comprising a pair of fluid pressure controlled power transmission units, a common source of fluid operating pressure for said units, each of said units being normally subject to full operating pressure from said source, and a variable pressure control device for each of said units to connect the same to said source and operative to regulate the pressure acting on said units, each of said control devices being provided with a passage from said source to the unit, adjustable means to variably diminish the pressure in said passage, and a spring urged check member for each of said control devices acting to maintain a predetermined pressure in said passage when the pressure on one of said fluid operated units becomes lower than said full operating pressure.

31. A planetary-type driving and steering mechanism comprising a rotatable driving member and a rotatable driven member coaxial with said driving member, a planetary carrier rotatable with one of said members and having planet gears thereon, a reaction member meshing with said gears and acting to provide a planetary drive connection between said driving and driven members, a clutch device normally locking said reaction member to said carrier for rotation with the latter, means to control said clutch device comprising a pressure member for actuating said clutch device and means for applying hydraulic force to said pressure member to engage said clutch device and maintain said locked condition of the carrier and reaction member, means to govern the rate of rotation of said driven member, means for governing the relative rate, of rotation of said reaction member and carrier, and means for releasing said hydraulic pressure to release said clutch device, said pressure releasing means being operatively connected to said respective rate governing means for coordinate operation with either thereof.

32. A planetary-type driving and steering mechanism comprising a rotatable driving member and a rotatable driven member coaxial with said driving member, a planetary carrier rotatable with one of said members and having planet gears thereon, a reaction member meshing with said gears and acting to provide a planetary drive connection between said driving and driven members, a clutch device normally locking said reaction member to said carrier for rotation with the latter, means to control said clutch device comprising a pressure member for actuating said clutch device and means for applying hydraulic force to said pressure member to engage said clutch device and maintain said locked condition of the carrier and reaction member, means to govern the rate of rotation of said driven member, means for governing the relative rate of rotation of said reaction member and carrier, means for releasing said hydraulic pressure to release said clutch device, said pressure releasing means being operatively connected to said respective rate governing means for coordinate operation with either thereof, common control means for coordinately actuating said releasing and first named rate governing means, and further common control means for coordinately actuating said releasing and second named rate governing means.

33. A power transmission mechanism of the type described, comprising a rotary, annular power transmitting member, a rotary support therefor, means removably mounting said member on said support, a power transmission assembly operatively engaged by said annular power transmitting member, said assembly including a drum adjacent said member provided with an axially extending, annular recess opening to a side thereof, which recess is of a diameter generally corresponding to that of said member, said recess axially receiving said member within said drum upon release of said removable mounting means and removal of said member from said support, a shaft telescopingly mounted coaxially of and extending entirely through said power transmission assembly, means mounting said shaft for endwise removal from said assembly, and a casing housing said power transmitting member and assembly, from which casing said assembly may be removed as a unit in a direction transversely of the shaft axis, with said annular member in said recess, upon said axial removal of the shaft and removal of the power transmitting member from said support.

34. A power transmission mechanism of the type described, comprising a rotary, annular power transmitting gear, a rotary support therefor, means removably mounting said gear on said support, a power transmission assembly operatively engaged by said annular power transmitting gear, said assembly including a drum adjacent said gear provided with an axially extending, annular recess opening to a side thereof, which recess is of a diameter generally corresponding to that of said gear, said recess axially receiving said gear within said drum upon release of said removable mounting means and removal of said gear from said support, said assembly further including planetary gearing carried by said drum and meshing with said annular gear, a shaft telescopingly mounted coaxially of and extending entirely through said power transmission assembly, means mounting said shaft for endwise removal from said assembly, and a casing housing said power transmitting gear and assembly, from which casing said assembly may be removed as a unit in a direction transversely of the shaft axis, with said annular gear in said recess, upon said axial removal of the shaft and removal of the power transmitting gear from said support.

OSCAR H. BANKER.

REFERENCES CITED

The following references are of record in the file of this patent:

UNITED STATES PATENTS

| Number | Name | Date |
|---|---|---|
| 848,368 | Hobbs | Mar. 26, 1907 |
| 993,825 | Cramer | May 30, 1911 |
| 1,636,700 | McKinney | July 26, 1927 |
| 2,088,110 | Lamb | July 27, 1937 |
| 2,193,305 | Thompson | Mar. 12, 1940 |
| 2,260,759 | Surdy | Oct. 28, 1941 |
| 2,353,554 | Gates | July 11, 1944 |
| 2,426,063 | Stevens | Aug. 19, 1947 |
| 2,480,933 | Jandasek | Sept. 6, 1949 |

Certificate of Correction

Patent No. 2,580,381          January 1, 1952

OSCAR H. BANKER

It is hereby certified that error appears in the printed specification of the above numbered patent requiring correction as follows:

Column 9, line 8, for "egars" read *gears*; column 10, line 30, for "means is" read *means in*; column 11, line 8, after "member," insert *a rotatable driven member*,; column 13, line 4, for "projected" read *projects*;

and that the said Letters Patent should be read as corrected above, so that the same may conform to the record of the case in the Patent Office.

Signed and sealed this 22nd day of April, A. D. 1952.

[SEAL]

THOMAS F. MURPHY,
*Assistant Commissioner of Patents.* means for releasing said hydraulic pressure to release said clutch device, said pressure releasing means being operatively connected to said respective rate governing means for coordinate operation with either thereof, common control means for coordinately actuating said releasing and first named rate governing means, and further common control means for coordinately actuating said releasing and second named rate governing means.

33. A power transmission mechanism of the type described, comprising a rotary, annular power transmitting member, a rotary support therefor, means removably mounting said member on said support, a power transmission assembly operatively engaged by said annular power transmitting member, said assembly including a drum adjacent said member provided with an axially extending, annular recess opening to a side thereof, which recess is of a diameter generally corresponding to that of said member, said recess axially receiving said member within said drum upon release of said removable mounting means and removal of said member from said support, a shaft telescopingly mounted coaxially of and extending entirely through said power transmission assembly, means mounting said shaft for endwise removal from said assembly, and a casing housing said power transmitting member and assembly, from which casing said assembly may be removed as a unit in a direction transversely of the shaft axis, with said annular member in said recess, upon said axial removal of the shaft and removal of the power transmitting member from said support.

34. A power transmission mechanism of the type described, comprising a rotary, annular power transmitting gear, a rotary support therefor, means removably mounting said gear on said support, a power transmission assembly operatively engaged by said annular power transmitting gear, said assembly including a drum adjacent said gear provided with an axially extending, annular recess opening to a side thereof, which recess is of a diameter generally corresponding to that of said gear, said recess axially receiving said gear within said drum upon release of said removable mounting means and removal of said gear from said support, said assembly further including planetary gearing carried by said drum and meshing with said annular gear, a shaft telescopingly mounted coaxially of and extending entirely through said power transmission assembly, means mounting said shaft for endwise removal from said assembly, and a casing housing said power transmitting gear and assembly, from which casing said assembly may be removed as a unit in a direction transversely of the shaft axis, with said annular gear in said recess, upon said axial removal of the shaft and removal of the power transmitting gear from said support.

OSCAR H. BANKER.

REFERENCES CITED

The following references are of record in the file of this patent:

UNITED STATES PATENTS

| Number | Name | Date |
|---|---|---|
| 848,368 | Hobbs | Mar. 26, 1907 |
| 993,825 | Cramer | May 30, 1911 |
| 1,636,700 | McKinney | July 26, 1927 |
| 2,088,110 | Lamb | July 27, 1937 |
| 2,193,305 | Thompson | Mar. 12, 1940 |
| 2,260,759 | Surdy | Oct. 28, 1941 |
| 2,353,554 | Gates | July 11, 1944 |
| 2,426,063 | Stevens | Aug. 19, 1947 |
| 2,480,933 | Jandasek | Sept. 6, 1949 |

---

Certificate of Correction

Patent No. 2,580,381                  January 1, 1952

OSCAR H. BANKER

It is hereby certified that error appears in the printed specification of the above numbered patent requiring correction as follows:

Column 9, line 8, for "egars" read *gears*; column 10, line 30, for "means is" read *means in*; column 11, line 8, after "member," insert *a rotatable driven member*,; column 13, line 4, for "projected" read *projects*;

and that the said Letters Patent should be read as corrected above, so that the same may conform to the record of the case in the Patent Office.

Signed and sealed this 22nd day of April, A. D. 1952.

[SEAL]

THOMAS F. MURPHY,
*Assistant Commissioner of Patents.*

Certificate of Correction

Patent No. 2,580,381 — January 1, 1952

OSCAR H. BANKER

It is hereby certified that error appears in the printed specification of the above numbered patent requiring correction as follows:

Column 9, line 8, for "egars" read *gears*; column 10, line 30, for "means is" read *means in*; column 11, line 8, after "member," insert *a rotatable driven member,*; column 13, line 4, for "projected" read *projects*;

and that the said Letters Patent should be read as corrected above, so that the same may conform to the record of the case in the Patent Office.

Signed and sealed this 22nd day of April, A. D. 1952.

[SEAL]

THOMAS F. MURPHY,
*Assistant Commissioner of Patents.*